United States Patent [19]

Linsenmeyer

[11] 4,261,831
[45] Apr. 14, 1981

[54] CLEANER FOR DRUM TYPE VACUUM FILTER SYSTEM

[76] Inventor: Stephen J. Linsenmeyer, 127 Hollywood Dr., Monroe, Mich. 48161

[21] Appl. No.: 58,429

[22] Filed: Jul. 18, 1979

[51] Int. Cl.³ ............................................. B01D 33/40
[52] U.S. Cl. .................................. 210/391; 134/172; 210/409
[58] Field of Search ............... 210/391, 393, 400, 401, 210/406, 407, 408, 409; 134/172, 198, 167 R, 168 R

[56] References Cited

U.S. PATENT DOCUMENTS

| | | | |
|---|---|---|---|
| 2,807,501 | 9/1957 | Richards | 210/409 |
| 3,075,646 | 1/1963 | Giesse | 210/409 |
| 3,113,926 | 12/1963 | Kroff | 210/391 |
| 3,578,775 | 5/1971 | McMillen | 134/172 |
| 3,780,747 | 12/1973 | Stadle et al. | 210/225 |
| 4,076,033 | 2/1978 | Busse et al. | 134/172 |
| 4,129,137 | 12/1978 | Kurita | 134/198 |

*Primary Examiner*—Theodore A. Granger
*Attorney, Agent, or Firm*—Richard C. Ruppin

[57] ABSTRACT

Apparatus for cleaning a drum type vacuum filter having a rotating drum and a porous belt wrapped around and rotating with the drum. Liquid in a slurry carried by the belt is withdrawn through the belt and through grids carried on the drum and openings in the drum surface by a vacuum within the drum. Small particles of solids in the slurry are also drawn through the belt and lodge in and clog the grids and drum surface openings. The cleaning apparatus is positioned in a space formed between the belt and the drum by the travel of the belt from the drum and the return of the belt to the drum. The cleaning apparatus has a spray header movable along the length of the drum and carrying a plurality of nozzles facing the drum surface and grids mounted thereon and is connected to a source of high pressure liquid which is sprayed by the nozzles on the drum openings and grids to clean the solids from them. The number of nozzles and size of the spray header is relatively small compared to the size of the drum so that a large amount of cleaning force is applied to a small drum surface area.

5 Claims, 4 Drawing Figures

CLEANER FOR DRUM TYPE VACUUM FILTER SYSTEM

BACKGROUND OF THE INVENTION

This invention relates to a continuous belt, drum type vacuum filter system and, in particular, to an improved apparatus for cleaning the drum surface and elements associated with the drum surface.

A drum type vacuum filter basically consists of a cylindrical drum covered with a filtering material or fabric which rotates partially submerged in a tank containing a slurry comprising solids and a liquid. Where the vacuum filter is used in a sewage treatment plant, the slurry will be a sludge of solid wastes and water. As the drum and belt rotate, the slurry will adhere to the outer surface of the belt and be carried on the belt along the surface of the drum out of the tank. The drum has a plurality of openings in its cylindrical surface and a vacuum is applied internally of the drum to extract water from the slurry. In being drawn into the drum by the vacuum, the water passes through pores or spaces in the belt and through the drum surface openings, leaving the solids on the belt. As the drum and belt continue rotating, the belt passes off or extends from the drum over relatively small rollers to dislodge the solids and again returns to the drum and passes into the tank. In addition, a scraper blade is typically positioned against the belt to insure that the solids are removed from the belt. Also to assist in flow of the water from the slurry through the belt and into the drum, means such as grids carried on the cylindrical drum surface and maintaining the belt at a spacing from the drum surface are used.

A serious problem with this type of filter system is that small particles of the solid in the slurry are drawn through the pores or openings in the belt and into the grid openings and the openings in the drum surface. These solid particles will plug the belt pores as well as the grid and drum surface openings so that the filter system becomes inoperative. The solid particles tend to harden in the grid and drum surface openings and become extremely difficult to remove. Cleaning of the grids and drum surface openings is quite difficult since most of the drum surface is covered by the belt. Moreover, attempting to clean the grids and the drum surface openings in the space formed by the drum and the extension and return of the belt from the drum is also quite difficult since the axial length of the drum and the width of the belt is considerable. For example, lengths of vacuum filter drums are typically between 20 and 30 feet.

Solutions to the problem have included the placing of an elongated pipe or spray header running the full axial length of the drum in the space formed by the drum and the extension and return of the belt from the drum. Spray nozzles are located in the spray header along its full length to spray water against the drum surface or against the belt to provide a cleaning effect. This approach is very ineffective and is not believed to be practiced to any great extent on commercial vacuum drum filter systems. Steam cleaning methods are also used in which the belt is removed from the drum, a large enclosure is placed over the drum and the drum is subjected to steam until the solids clogging the drum surface openings and grid openings disintegrate. Disadvantages of this type of cleaning include the necessity of removing the belt, the expense and problem of a large enclosure over the drum and the cost of a boiler for providing steam.

Other methods include manual cleaning which requires removal of the belt and the grids from the drum and manually cleaning the drum openings and the grids. Methods such as soaking the grids in any of a variety of cleaning baths and/or subjecting the grids and the drum surface to ultrasonic devices may also be utilized. The disadvantages of these methods also include the necessity of removing the belt and removing the grids. It can be appreciated that the foregoing described cleaning methods require the drum filter to be taken out of operation for a considerable length of time. Also, the amount of manual labor in removing the belt and cleaning the grids and drum surface is substantial. Further, removing the belts from the drum deteriorates the belts to the extent that they typically cannot be put back into service. The belts are quite expensive and the inability to continue their use adds a large expense to the operation of the sewage treatment plant.

SUMMARY OF THE INVENTION

The principal object of the present invention is to provide a cleaner for a drum type vacuum filter system which eliminates the aforementioned defects and problems of presently known apparatus and methods.

Another object of the present invention is to provide in a drum type vacuum filter system having a filter belt rotating with a drum, apparatus for using high pressure liquid to effectively clean the drum surface and openings therein and elements such as grids positioned between the drum and belt and carried on the drum surface without removing the belt or grids from the drum.

A further object of the present invention is to provide, in a drum type vacuum filter system having a filter belt rotating with the drum and extending from and returning to the drum along a portion of the belt length, apparatus for using high pressure liquid to clean the surface of the drum and openings therein and grids carried on the drum surface, which fit in the space between the drum and the portion of the belt extending from the drum and which permits concentration of high pressure liquid spray on a limited surface area of the drum to maximize the cleaning force.

A still further object of the present invention is to provide, in a drum type vacuum filter system having a belt rotating with the drum and extending from and returning to the drum along a portion of the belt length, cleaning apparatus for the drum surface and elements positioned on the drum surface which is movable within the space between the drum and the portion of the belt extending from the drum along the entire axial length of the drum.

Another object of the present invention is to provide, in a drum type vacuum filter system having a belt rotating with the drum and extending from the drum along a portion of the belt length, cleaning apparatus for the drum surface and elements carried on the drum surface having a drive means which does not extend substantially beyond the width of the drum.

In a drum type vacuum filter, the belt which is positioned around the drum is a porous filter cloth having a desired mesh size. However, other types of filter material may be used, for example, string type filter material may be used in which the filter belt comprises a large number of cords or strings positioned closely together around the drum along the drum's axial length. Although the mesh size of the filter belt may be quite small, small particles of solids in the slurry are nevertheless drawn through the belt and the grids mounted on the drum and separating the belt from the drum and thence through the vacuum openings in the drum. The solid particles adhere to the grid openings and the vacuum openings in the drum and eventually clog the openings until the vacuum is no longer effective to draw liquid out of the slurry. The present invention permits highly effective cleaning of the drum openings and grids openings by positioning a movable spray header connected to a source of high pressure liquid in the space between the extended belt and the drum surface immediately opposite the drum surface. The spray header carries a plurality of nozzles and is relatively small compared to the axial length of the drum and the drum surface area which is to be cleaned. When connected to the high pressure liquid source, the small size of the spray header and the small area against which spray from the header is applied permits a very large force to be applied to the drum surface area which is extremely effective in cleaning the drum grids and drum openings in a relatively short length of time. The spray header is mounted on a support member that extends the axial length of the drum and the spray header is movable along substantially the full length of the support member to clean the entire surface of the drum as the latter rotates. The high pressure liquid is supplied to the spray header by a flexible hose which can be extended into or drawn out of the space in which the spray header is located. Drive means for the spray header may be either manual or a suitable motor source and may be located substantially entirely within the space between the extended belt and drum surface.

As used herein, the term "slurry" is intended to mean any admixture of liquids and solids from which it is desired to remove the liquids. For example, slurries which can have liquid removed from them by a drum type vacuum filter include sludges treated at sewage treatment plants, other types of wastewater containing solids, and wood pulp or paper mashes being processed at paper producing mills.

BRIEF DESCRIPTION OF THE DRAWINGS

The foregoing and other objects and features of the present invention will be more clearly understood from the following detailed description thereof when read in conjunction with the accompanying drawings in which.

DESCRIPTION OF THE PREFERRED EMBODIMENT

Figure 1:
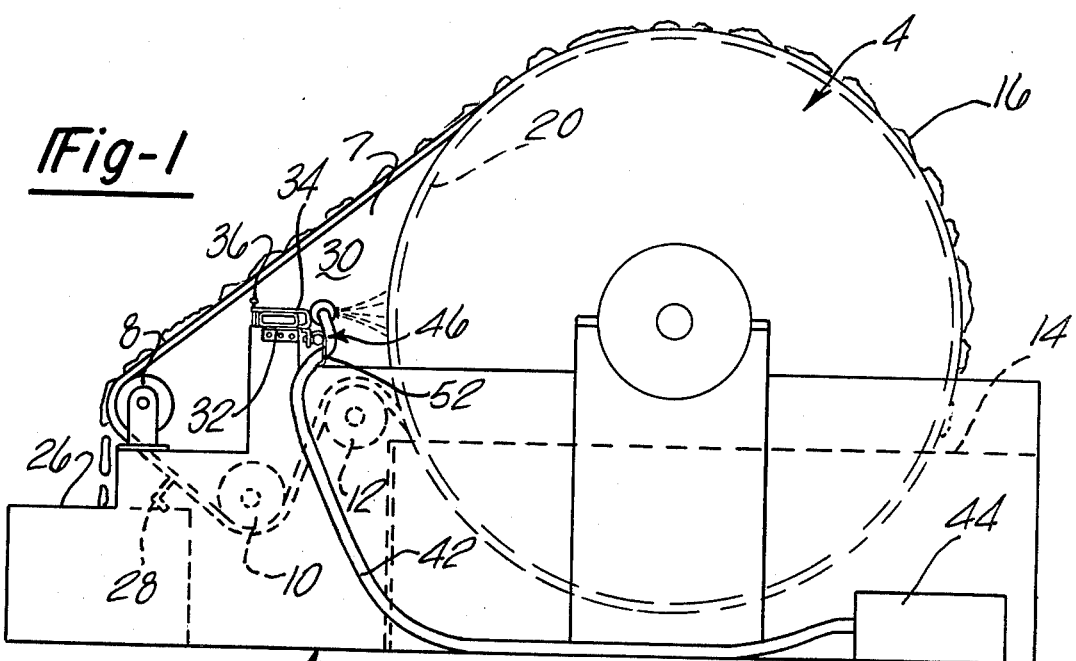
FIG. 1 is an elevation view of a drum type vacuum filter system including the cleaner apparatus according to the present invention.
Figure 2:
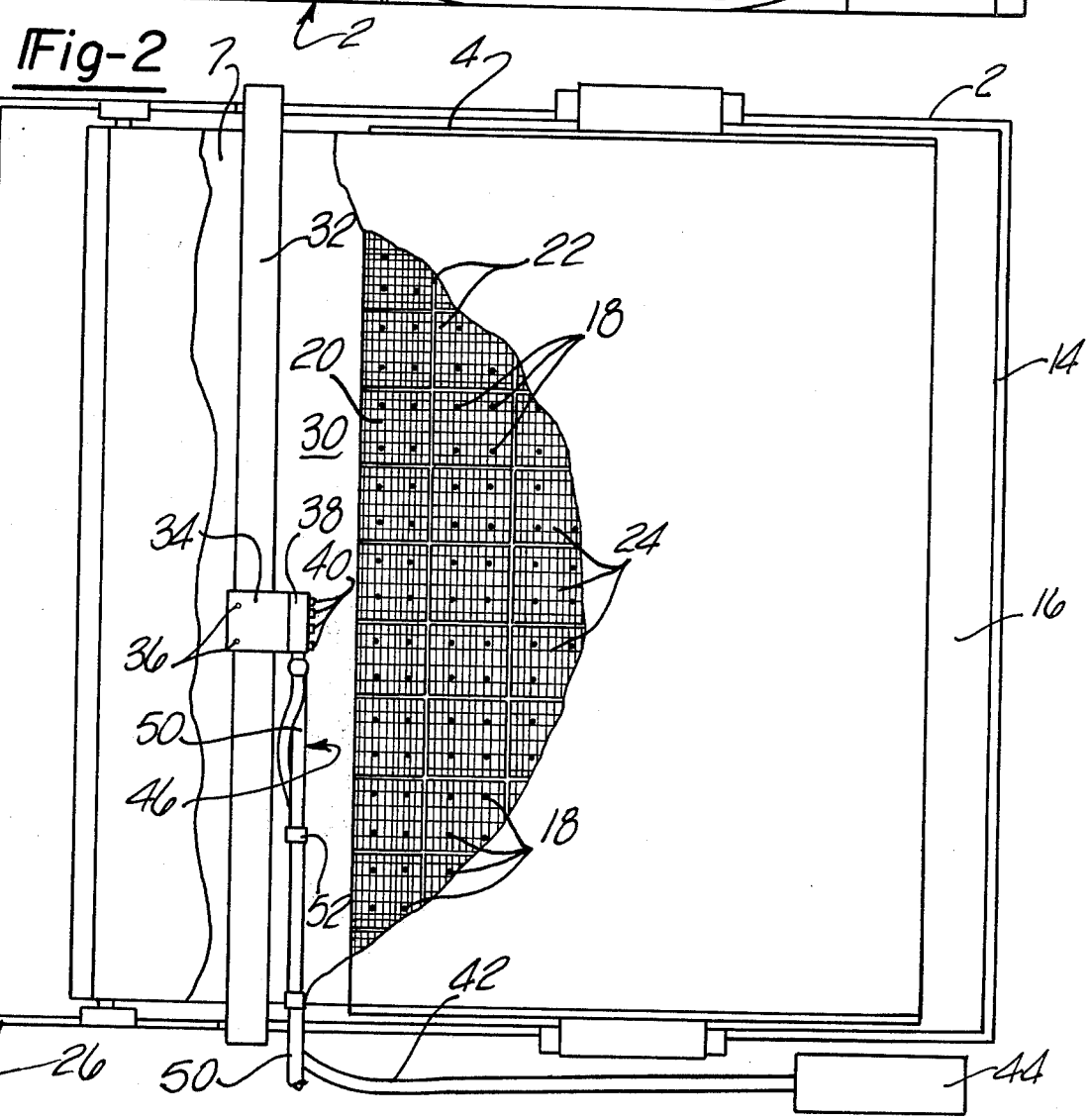
FIG. 2 is a plan view, partially broken away, of the filter system shown in FIG. 1.

Referring now to FIGS. 1 and 2 of the drawings, a drum type vacuum filter system is shown as having a frame 2 and a drum 4 rotatably mounted on the frame 2. A porous filter belt 6 is positioned around the drum 4 for rotation with the drum and the belt 6 extends from the drum to pass around the rollers 8, 10, and 12 and return again to the drum 4. The portion of the belt 6 extending and returning from the drum 4 forms a space 7 between the belt 6 and drum 4. The rollers 8, 10 and 12 support the filter belt 6 in the desired position and at least one of the rollers is movable to permit adjustment of tension on the filter belt 6.

The frame 2 includes a tank 14 containing a slurry 16 from which liquid is to be removed by the filter system. The filter belt 6 and the drum 4 rotate through the tank 14 and pick up the slurry 16 as shown in FIG. 1. A vacuum is applied internally of the drum 4 which causes air at atmospheric pressure to be drawn through the plurality of openings 18 in the drum cylindrical surface 20. A plurality of grids 22 each having a plurality of honeycomb openings 24 in communication with the openings 18 in the drum surface 20 are mounted on the drum surface 20. The grids 22 serve to maintain the belt 6 spaced from the drum surface 20 so that liquids from the slurry 16 will readily flow through the belt 6 and into the drum openings 18. The grids 22 may be made of any suitable material, however, they are preferably made of a high durability material such as nylon. Other means may be used to maintain separation between the belt 6 and the drum surface 20 such as ribs projecting from the surface of the belt 6 facing the drum surface 20. However, grids such as disclosed herein are quite effective and are used in many commercial drum type vacuum filters. As previously stated, the vacuum within the drum 4 draws liquid from the slurry 16 through the filter belt 6 and, in view of the position of the grids 22 between the belt 6 and the drum surface 20, through the openings 24 in the grids 22 and finally into the drum 4 through openings 18. The liquid drawn from the slurry 16 into the drum 4 may be pumped from the drum by any suitable means (not shown). As the liquid is drawn into the drum 4, small particles of solids in the slurry 16 are also drawn through the filter belt 6, the grid openings 24 and the drum surface openings 20. The solids tend to lodge in the belt and the openings such that ultimately the openings will become plugged and the filtering system will become ineffective.

After the liquid is withdrawn from the slurry 16, the solids portion of the slurry continues on the belt 6 as it passes from the drum 4. As the belt 6 moves around the roller 8, some of the solids will fall from the belt 6 into solids tank 26. Any solids that continue to adhere to the belt 6 after it moves around roller 8 are removed by scraper 28.

Figure 3:
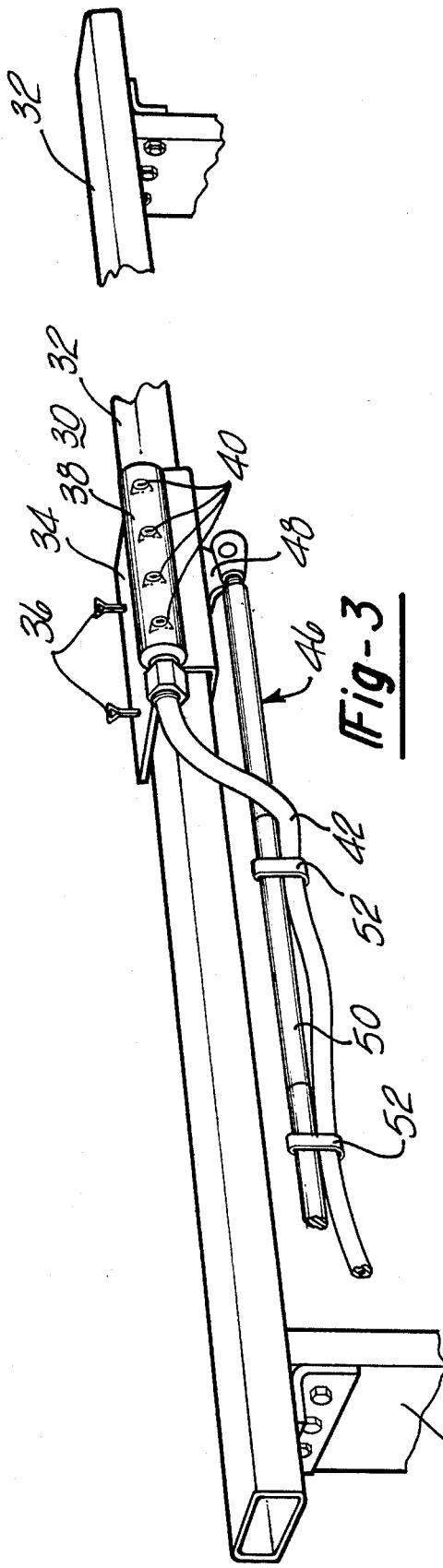
FIG. 3 is a perspective view of the cleaner apparatus shown in FIGS. 1 and 2.

Referring now to FIGS. 1, 2 and 3, a cleaner apparatus 30 is shown mounted on the frame 2. The cleaner apparatus 30 includes support member 32 affixed to the frame 2, a support bracket 34 slideably mounted on the support member 32 for movement along the length of the support member 32 within the space 7, and means such as cotter pins 36 projecting through the support bracket 34 for retaining the latter on the support member 32. A spray header 38 is rigidly affixed to the support bracket 34 and contains a plurality of orifices or nozzles 40 facing and spaced from the drum surface 20. The spray header 38 is thus movable with the bracket 34 on the support member 32 along the drum surface 20 over the full axial length of the drum 4. The spray header 38 is connected by means of a hose 42 to a pressurized liquid supply source 44. The pressurized liquid is typically high pressure water, however, the water may also carry chemicals or other materials for facilitating cleaning of the drum surface 20 and the grids 22. A drive means 46 for the spray header 38 is connected to a tab 48 on support bracket 34 and comprises one or more rods 50 which may be threaded together and to the tab 48 and used to push the spray header 38 across the surface of the drum 20. While the spray header 38 is near the end of the drum 4, only one rod may be used. As the spray header 38 is moved towards the opposite end of the drum 4, additional rods 50 may be threaded together to permit continued movement of the spray header 38 along the axial length of the drum 4. Hose support hooks 52 are carried on the rods 50 for supporting the hose 42 with the space 7 so that the hose 42 does not interfere with the movement of the belt 6. As the spray header 38 is moved along the surface of the drum 20 by the drive means 46, the hose 42 may be inserted into or removed from the hooks 52 as needed.

Figure 4:
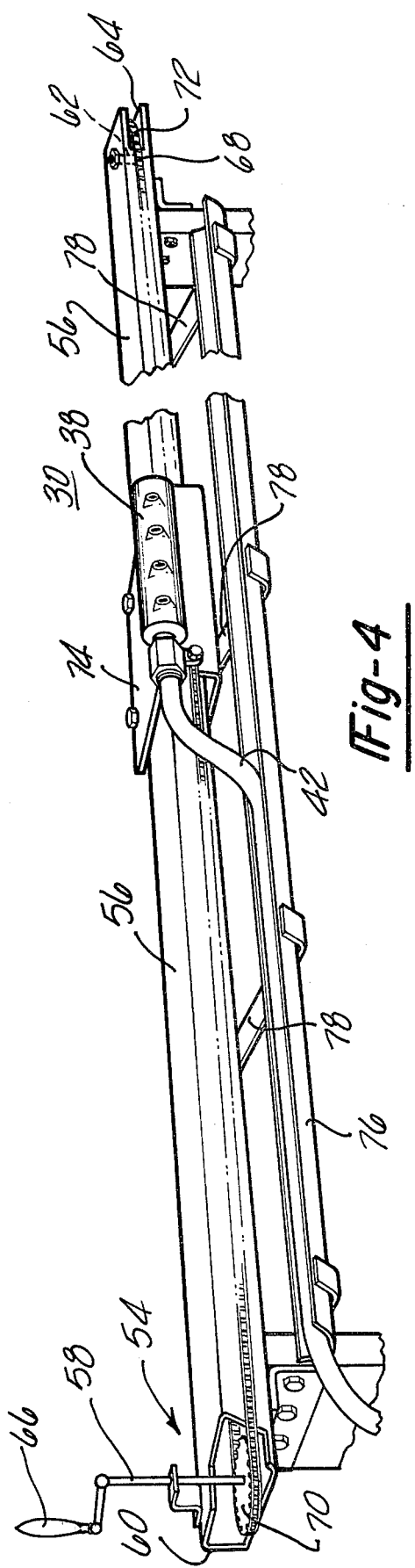
FIG. 4 is a perspective view of another embodiment of the cleaner apparatus.

Referring to FIG. 4, another embodiment of the cleaner apparatus is shown in which elements which are substantially the same as those shown in the embodiment illustrated in FIG. 3 carry the same identifying numerals. The cleaner apparatus 30 shown in FIG. 4 utilizes a sprocket and chain drive means 54 mounted on the support member 56. The drive means 54 includes a rotatable shaft 58 mounted on the hollow end 60 of the support member 56 and a second shaft 62 mounted through the hollow end 64 of the support member 56. Sprocket gears 70 and 72 are respectively affixed to the shafts 58 and 62 within the ends 60 and 64. The shaft 58 is manually rotatable by means of a handle 66. A chain 68 is connected at both its ends to support bracket 74 and extends through the hollow length of the support member 56 and passes around the sprocket gears 70 and 72. The support bracket 74 carries the spray header 38 and is movable along substantially the full length of the support member 56 by rotation of the shaft 58 to drive the chain 68. A hose support tray 76 is mounted on the support member 56 by arms 78 to hold the hose 42 within the space 7.

As previously discussed, the axial length of the drum of a drum type filter system is quite long and typically will have a length of between 20 and 30 feet. The spray header 38 of the invention, however, has a length dimension parallel to the axis of the drum 4 which is quite small compared to the full axial drum length and relatively few spray orifices 40 compared to stationary type spray headers which have sufficient orifices to simultaneously spray along the entire axial length of the drum. The dimensions of the spray pattern or area of the orifices 40 on the drum surface 20 is thus limited to a very small part of both the axial length of the drum and the circumferential length of the drum so that all of the force of the high pressure water is concentrated on a small, limited area. For example, a high degree of cleaning in a minimal amount of time can be attained by utilizing four spray orifices 40 having a focal distance from the drum surface 20 of 8 inches and an included spray angle for each orifice of 40°. With a 25% spray overlap on the drum surface 20, the orifices would have a center-to-center spacing of 4.25 inches. The overall length of the spray header 38 would be three center-to-center spacing distances of 4.25 inches plus about 1.5 inches at both ends of the header for a total length of about 16 inches and a spray pattern width of approximately 18 inches. The spray pattern width is thus approximately 5% to 7% of the axial length of a drum 4 and preferably should not be greater than about 10% of the axial length of the drum.

The allowable size of the orifices 40 and therefore the cleaning rate of the cleaner apparatus 30 is dictated by the volume and pressure of the water available from the supply source 44. It has been found, for example, that four orifices 40 each having a 0.062 diameter can be effectively used with a supply source capacity of 35 gallons per minute at 4,000 lbs. per square inch (psi) pressure. In general, it is preferable that the water supply pressure be between 4,000 and 5,000 psi and not less than 2,500 psi.

As may be appreciated from the aforegoing description, due to its movability along the surface 20 of the drum 4, the spray header 38 is controllable to clean any particular spot or area on the drum surface 20 that may need special attention. As disclosed herein, the drive means may be manually operated and therefore controlled, however, mechanical or electrical drive means which may be either manually or automatically controlled may be also utilized.

It may thus be seen that a cleaner apparatus for a drum type vacuum filter system has been invented which permits access to the drum surface and grids carried thereon without removing the belt or the grids from the drum. Furthermore, the cleaning apparatus according to the invention is far more effective than previously known washing systems and is controllable to permit cleaning where most needed.

It will be understood that the foregoing description of the present invention is for purposes of illustration only, and that the various structural and operational features herein disclosed are susceptible to a number of modifications and changes, none of which entail any departure from the spirit and scope of the present invention as defined in the hereto appended claims. For example, in addition to the drive means previously described, the drive means may also be a screw type drive mechanism.

What is claimed is:

1. In a filtering unit including a rotary filtering drum having a surface with a plurality of openings therein, a porous filter belt around and rotating with the drum and on which a slurry comprising a liquid and solid is carried, said belt extending away from and returning back to the drum along a portion of the circumference of the drum whereby a space is formed between the drum surface and the belt means for applying a vacuum to the interior of the drum for withdrawing liquid from said slurry, and means for removing the solid portion of said slurry from the belt, the combination comprising:

header means spaced from and being movable along the drum surface within said space, said header means having a length parallel to the axis of the drum that is less than the axial length of the drum;

nozzle means on said header facing and spaced from said drum surface;

liquid supply means including a flexible hose connected to said header means for supplying pressurized liquid to said nozzle means whereby the drum surface is sprayed by the pressurized liquid as the drum rotates and the header means moves along the drum surface and solids from said slurry which have passed through the belt and adhered to the openings in the drum surface are removed;

support means for supporting said hose horizontally within said space, said support means comprising hook-like trough structure constructed and arranged to slidably support the hose as the header moves along the surface of the drum;

header support means comprising a track on which the header is slidably engaged, said header support means extending the full length of the drum; and drive means supported by said header support means and being constructed and arranged to provide reciprocating movement of said header along said header support means.

2. The combination according to claim 1 wherein said nozzle means has a plurality of nozzles each having a spray pattern, and substantially all of the axial length of the drum is engaged by the spray pattern of each of said plurality of nozzles during a single traverse of the header means along the full axial length of the drum.

3. The combination according to claim 1 wherein said nozzle means has a spray pattern, the width of the spray pattern being not greater than 10% of the axial length of said drum.

4. The combination according to claim 3 wherein:
said nozzle means has a plurality of nozzles, each nozzle having an orifice; and
said pressurized liquid has a pressure of not less than approximately 2,500 psi at said orifice.

5. In a filtering unit including a rotary filtering drum having a surface with a plurality of openings therein, a porous filter belt around and rotating with the drum and on which a slurry comprising a liquid and solid is carried, said belt extending away from and returning back to the drum along a portion of the circumference of the drum whereby a space is formed between the drum surface and the belt, means for applying a vacuum to the interior of the drum for withdrawing liquid from said slurry, and means for removing the solid portion of said slurry from the belt, the combination comprising:

header means spaced from and being movable along the drum surface within said space, said header means having a length parallel to the axis of the drum that is less than the axial length of the drum;

nozzle means on said header facing and spaced from said drum surface;

liquid supply means including a flexible hose connected to said header means for supplying pressurized liquid to said nozzle means whereby the drum surface is sprayed by the pressurized liquid as the drum rotates and the header means moves along the drum surface and solids from said slurry which have passed through the belt and adhered to the openings in the drum surface are removed;

header support means comprising a track on which the header is slidably engaged, said header support means extending the full length of the drum; and handle means connected to said header for moving said header along the length of said track, said handle means being comprised of engageable sections to vary its length, said handle means including hook-like trough structure for supporting said hose substantially horizontally.

* * * * *